Nov. 25, 1930.  P. JAMESON  1,782,655

PITMAN OR CONNECTING ROD CONSTRUCTION

Filed Feb. 29, 1928

Inventor.
Peter Jameson
by Heard Smith & Tennant.
Attys.

Patented Nov. 25, 1930

1,782,655

UNITED STATES PATENT OFFICE

PETER JAMESON, OF WEST QUINCY, MASSACHUSETTS

PITMAN OR CONNECTING-ROD CONSTRUCTION

Application filed February 29, 1928. Serial No. 257,842.

This invention relates to improvements in the construction of the pitman or connecting rod which connects a reciprocating to a rotating member and is particularly designed for connecting the piston of an internal combustion engine, or the like, to the crank shaft.

In usual constructions the pitman or connecting rod is provided with an enlarged head having a two-part bearing usually provided with a bushing which engages the crank shaft. When the bearing has become worn the effective length of the piston is shortened as the section of the bearing in the piston head, which receives the impetus of the piston when impelled by the explosion within the cylinder, wears more rapidly than the complementary bearing section, so that the upper face of the piston head is not raised during the exhaust and compression strokes to the proper normal height. The compression of the explosive mixture in the cylinder is thereby lessened by reason of the increase in the volume of the chamber between the upper face of the piston head and the cylinder head.

Furthermore, it is found in practice that the bearings of the different pitmen of a multi-cylinder engine will wear unevenly so that in the running of the engine considerable variation in compression of the different cylinders is produced and consequently the effective force of the explosion of the different cylinders varies.

Where the bearings of one or more of the pitmen are worn to a considerably greater extent than others, the effective force of explosion in the cylinders having the greater compression will impart an impetus to their cranks upon the shaft which will so increase its speed of rotation as to produce knocks in the worn bearing.

The principal object of the present invention is to provide a convenient mechanism by means of which the wear upon the bearings of the pitman may be compensated so as to restore the pitman to its proper effective length.

A further object of the invention is to provide a device of the character specified with interchangeable bearing blocks for the pitman so that by reversing these blocks the bearing will be given a longer life.

A further object of the invention is to provide interchangeable bearing blocks having recessed outer corners which will enable a smaller crank case to be employed, the recesses preferably being provided with sockets to receive the heads of the bolts connecting the bearing blocks together and to the head of the pitman.

A further object of the invention is to provide suitable fillers for the recesses in the bearing block which engages the head of the pitman to provide such bearing block with an area equal to the area of the head which it engages.

These and other objects and features of the invention will more fully appear from the following description and the accompanying drawing, and will be particularly pointed out in the claims.

Figure 1:
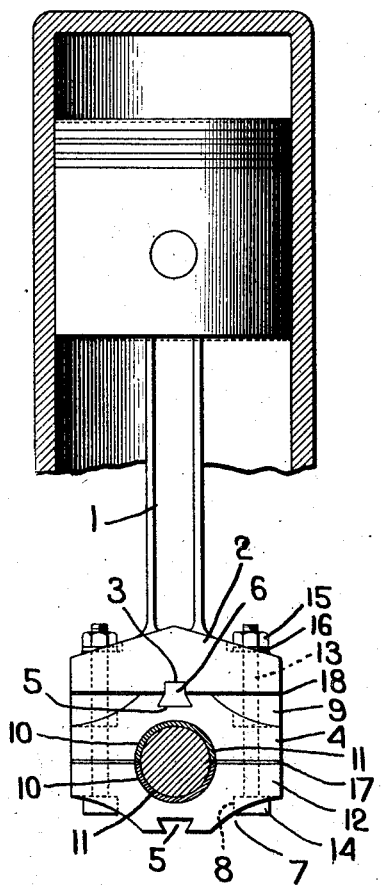
Fig. 1 is a view of a pitman and bearing blocks embodying the invention showing the same mounted upon a crank shaft, which is shown in section, and connected to the piston of an internal combustion engine, the cylinder of which is illustrated in section.
Figure 2:
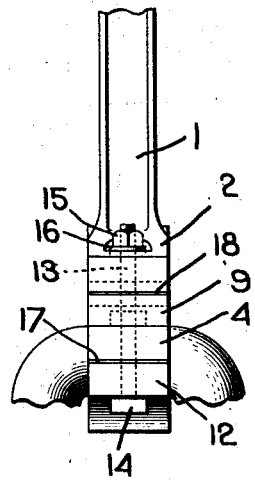
Fig. 2 is a detail side elevation showing the lower portion of the pitman connected to the crank shaft.
Figure 3:
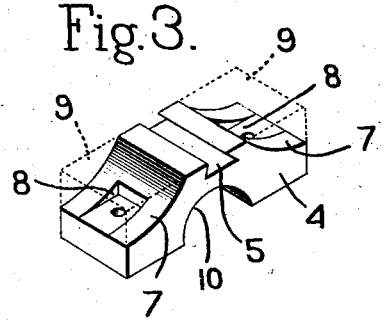
Fig. 3 is a detail view of one of the interchangeable bearing blocks and illustrating in dotted lines the filler for the recesses at the ends of the bearing block; and, Fig. 4 is a perspective view of a filler.
Figure 4:
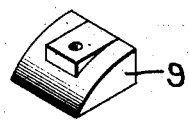

In the construction illustrated in the drawing the pitman 1 is illustrated as having an enlarged head 2, of preferably rectangular form, and provided centrally of its width with a key-way 3. A main, preferably rectangular, bearing block 4, preferably having a central dovetail groove 5 is adjustably connected to the head 2 by a suitable key 6 conforming to the key-ways 3 and 5 in the head and main bearing block.

By reason of this construction the key 6 is firmly secured in the main bearing block 4 and its rectangular portion vertically movable within the key-way 3 of the head. The ends of the main bearing block are provided with recesses 7 which are shown herein as of curved form with the bases provided with rectangular bolt-head receiving sockets 8. Suitable fillers 9, complementary to the recesses 7 and the sockets 8 are inserted in the recesses, as illustrated in Fig. 1, so that the upper face of the main bearing block presents a flat rectangular face corresponding to, and equal in area to, the lower face of the head 2 of the pitman.

The main bearing block 4 is provided with a central semi-cylindrical bearing section 10 which may be provided with a usual bushing 11. The complementary bearing block 12 desirably is like and preferably identical with the main bearing block 1 having similar recesses 7 and bolt-receiving sockets 8, a central key-way 5, a corresponding central bearing 10, and a bushing 11, so that the main and complementary bearing blocks are interchangeable. The bearing blocks are assembled upon the head by bolts 13 having rectangular heads 14 seated in the bolt-head receiving sockets 8 of the complementary bearing block and extending through the complementary and main bearing blocks, the fillers 9 and the head 2, and secured therein by suitable nuts 15 and spring washers 16. Desirably the main and complementary bearing blocks are spaced apart by one or more shims 17 and the main bearing block may be spaced apart from the head 2 by a shim or shims 18. Ordinarily, however, the use of a shim between the head and main bearing block is not required when the device is new.

When the upper section 10 of the bearing becomes worn the effective length of the piston is obviously shortened. By inserting a shim 18 of proper thickness between the head 2 of the pitman and the main bearing block, the proper length of the pitman can be restored. Wear of the bearing 10 of the complementary bearing block may be taken up by the removal or replacement of one or more of the shims 17.

Inasmuch as the bearing section 10 of the main bearing block will wear more rapidly than the bearing section of the complementary bearing block, the life of the bearing may be increased by interchanging the main and complementary bearing blocks as aforesaid. Such adjustments and reversal of the main and complementary bearing blocks to compensate worn bearings can be made readily upon the assembled engine without requiring the removal of the piston, and proper adjustment can be readily effected by removing the usual valves, and measuring the distance from the top of the cylinder head to the proper position for the piston when at the upper end of its stroke and inserting such shims 18 as may be required to restore it to that position.

It will be understood that while the present invention is particularly adapted for internal combustion engines, it may also be employed in connection with other types of engines, or may be embodied in pitman or connecting rods of any usual type which transform a reciprocating into a rotary movement, or vice versa, within the spirit and meaning of the following claims.

Having thus described the invention, what is claimed as new, and desired to be secured by Letters Patent, is:

1. A pitman, for connecting the piston to the crank shaft of an internal combustion engine and the like, comprising an enlarged head having a flat face, complementary bearing blocks of like construction and interchangeable, each having a central flat face adapted to engage the central portion of the flat face of the head and provided with recesses extending from said central portion to the ends of said bearing sections, a shim or shims interposed between the bearing block and the head, filler blocks in said recesses, a shim or shims interposed between said bearing blocks, and means clamping said bearing blocks together and to said head.

2. A pitman, for connecting the piston to the crank shaft of an internal combustion engine and the like, comprising an enlarged head having a flat face, complementary bearing blocks of like construction and interchangeable, each having a central flat face adapted to engage the central portion of the flat face of the head and provided with recesses extending from said central portion to the ends of said bearing sections, a shim or shims interposed between the bearing block and the head, filler blocks in said recesses, a shim or shims interposed between said bearing blocks, and means clamping said bearing blocks together and to said head, co-operating key-ways in said head and the central bearing portions of said blocks one of which presents a slot having parallel walls and the other of which slots is of dovetail form, and a key in said slots acting to prevent relative movement of said head and the block to which it is secured, but not to prevent adjustment by insertion or removal of said shims.

3. A pitman, for connecting the piston to the crank shaft of an internal combustion engine and the like, having a substantially rectangular enlarged head, a main bearing block adjustably keyed to said head and adapted to receive a shim or shims therebetween and having at its ends recesses extending from the face adjacent to the head provided with rectangular bolt-receiving slots, a central bearing section in the opposite face of said block, a complementary bearing member and bearing, filler blocks in the recesses of said main bearing block, bolts extending through said head, filler blocks and main and complementary bearing blocks, adapted to permit insertion and removal or replacement of shims between said head and main bearing block and between said main and complementary bearing block, whereby wear of the bearings and consequent variations in the effective length of the pitman may be compensated by the introduction or replacement of shims.

4. A pitman, for connecting the piston to the crank shaft of an internal combustion engine and the like, having a substantially rectangular enlarged head, a main bearing block adjustably keyed to said head and adapted to receive a shim or shims therebetween and having at its ends recesses extending from the face adjacent to the head provided with rectangular bolt-receiving slots, a central bearing section in the opposite face of said block, a complementary bearing member and bearing, of like construction, interchangeable with said main bearing block, filler blocks releasably mounted in the recesses of said main bearing block, complementary in form to said recesses and filling the same to provide in effect a solid rectangular main block having an area equal to the face of the head engaged thereby, and bolts having rectangular heads seated in the bolt-receiving sockets of said complementary bearing block and extending through the main and complementary bearing blocks, the said filler blocks and said head adapted to permit insertion and removal or replacement of shims between the head and main bearing block and between said main and complementary bearing blocks, whereby wear of the bearings and consequent variations in the effective length of the pitman may be compensated.

In testimony whereof, I have signed my name to this specification.

PETER JAMESON.